United States Patent

Räsänen et al.

[11] Patent Number: 5,319,730
[45] Date of Patent: Jun. 7, 1994

[54] CABLE CONSTRUCTION CONTAINING OPTICAL FIBERS AND REINFORCEMENT MEANS

[75] Inventors: Timo Räsänen; Jussi Ravela, both of Espoo, Finland

[73] Assignee: Nokia Kaapeli Oy, Helsinki, Finland

[21] Appl. No.: 961,881

[22] PCT Filed: Jul. 18, 1991

[86] PCT No.: PCT/FI91/00222

§ 371 Date: Jan. 11, 1993

§ 102(e) Date: Jan. 11, 1993

[87] PCT Pub. No.: WO92/01962

PCT Pub. Date: Feb. 6, 1992

[30] Foreign Application Priority Data

Jul. 19, 1990 [FI] Finland ................. 903658

[51] Int. Cl.⁵ ............................. G02B 6/44
[52] U.S. Cl. ........................ 385/114; 385/109; 385/110
[58] Field of Search ............ 385/114, 109, 110, 111

[56] References Cited

U.S. PATENT DOCUMENTS

| | | | |
|---|---|---|---|
| 4,846,566 | 7/1989 | Barnett et al. | 385/110 X |
| 4,859,025 | 8/1989 | Houghton | 385/114 |
| 4,979,794 | 12/1990 | Evans | 385/109 |
| 4,997,257 | 3/1991 | Spedding | 385/114 X |
| 5,067,830 | 11/1991 | McAlpine et al. | 385/114 |
| 5,163,116 | 11/1992 | Oestreich et al. | 385/111 |
| 5,224,191 | 6/1993 | Zeidler | 385/109 X |

FOREIGN PATENT DOCUMENTS

| | | |
|---|---|---|
| 0022036 | 1/1981 | European Pat. Off. |
| 76895 | 12/1984 | Finland . |
| 0150907 | 9/1983 | Japan ................. 385/114 |
| 0211713 | 12/1983 | Japan ................. 385/114 |
| 00477 | 1/1991 | PCT Int'l Appl. . |
| 2215081 | 9/1989 | United Kingdom . |
| 2219100 | 11/1989 | United Kingdom . |

Primary Examiner—Rodney B. Bovernick
Assistant Examiner—Hemang Sanghavi
Attorney, Agent, or Firm—Ladas & Parry

[57] ABSTRACT

A cable construction comprising at least one package (3) of fibre ribbons, which package consists of at least one fibre ribbon (4) comprising several parallel optical fibres (5) and a covering (6) joining them together, and at least one reinforcing member (7a) extending in the longitudinal direction of the cable. The package (3) of fibre ribbons is arranged in a cavity (2) with an elongated cross-section in the vertical direction such that the natural bending plane (A) of the fibre ribbon package (3) is substantially perpendicular with respect to the longitudinal plane (B) of the cavity. The reinforcing member (7a) is arranged in the cable construction in such a way that the bending plane (D) of the whole cable defined thereby also is substantially perpendicular with respect to the longitudinal plane (B) of the cavity.

7 Claims, 2 Drawing Sheets

CABLE CONSTRUCTION CONTAINING OPTICAL FIBERS AND REINFORCEMENT MEANS

FIELD OF THE INVENTION

The invention relates to a cable, comprising (i) at least one package of fibre ribbons, which package consists of at least one fibre ribbon comprising several parallel optical fibres and a covering joining them together, and (ii) at least one reinforcing member extending in the longitudinal direction of the cable.

BACKGROUND AND PRIOR ART

It is known to use in a cable optical fibre ribbons, comprising typically 4 to 12 parallel optical fibres and a covering manufactured of plastic material joining them together.

In a known cable construction, fibre ribbons are normally packaged tightly inside a plastic tube and the plastic tube is surrounded by a protective structure comprising reinforcing members extending in the longitudinal direction of the cable, which members are placed at regular intervals in the peripheral direction of the cable.

Another known cable construction is a so-called V-groove cable, in which fibre ribbons are placed in spirally or oscillatingly winding grooves positioned in a common centre element.

A drawback of these known cable constructions is that, due to the complicated structures thereof, the production costs are high. In the abovementioned constructions, it is, furthermore, not possible to provide in a simple manner a proper play for the fibres against changing dimensions caused by mechanical forces directed to protective sheath or by thermal effects.

SUMMARY OF THE INVENTION

The object of the present invention is thus to avoid the drawbacks described above. This is achieved by means of a cable construction according to the invention, which is characterized by a combination in which (i) at least one package of fibre ribbons is arranged in a cavity with an elongated cross-section in such a way that the natural bending plane of the fibre ribbon package is substantially perpendicular with respect to the longitudinal plane of the cavity, and (ii) at least one reinforcing member is arranged in the cable construction in such a way that the bending plane of the whole cable defined thereby also is substantially perpendicular with respect to the longitudinal plane of the cavity.

The basic idea according to the invention is to arrange the fibre ribbons and the reinforcing members with respect to the elongated cavity formed in the cable in such a way that the fibre ribbons are allowed to move inside the cavity, while extending, compressing or bending the cable, in such a manner that they bend with respect to their natural bending plane.

Thanks to the construction of the invention, the fibres can in an easy way be provided with a large play. Due to its simple structure, the cable of the invention also keeps the production costs low, and thereby, a cable network can be constructed more economically than before. The solution according to the invention improves the profitability especially at the lowest level of an optical cable network, i.e. within the area of a local network, where the number of fibres is highest and where the need to achieve cheaper solutions than the present ones is greatest.

In the construction of the invention, the cavity, the fibre ribbons and the reinforcing members are mutually arranged in such a way that a manufacture by means of a stationary (not turning) tool is made possible and the fibres can be provided with the extra length they need with respect to the protective sheath simply by allowing them to bend with respect to their natural bending plane. Moreover, the cable geometry of the invention allows a minimization of the cross-section of the cable, and consequently, an increase in the packing density of the cable.

According to one preferred embodiment of the invention, the reinforcing members consist of a pair of metallic conductors, whereby they can be used also for data transmission or e.g. supply of power.

According to a second preferred embodiment of the invention, the reinforcing members confine the cavity space within themselves and protect it. Thanks to such a construction, it is easy to branch the cable without damaging the fibres.

According to a third preferred embodiment of the invention, the cable core itself or a part of it constitutes a reinforcing member. No separate reinforcing members integrated inside the construction are then needed, but the cable core or a part of it determines the properties of the cable alone.

The cable geometry according to the invention makes it also possible to provide the protective structure with sliding/wear surfaces working as wear surfaces and reducing friction when the cable is drawn.

BRIEF DESCRIPTION OF THE DRAWINGS

The invention is explained in more detail in the following description with reference to the examples according to the enclosed drawings, in which.

DETAILED DESCRIPTION OF PREFERRED EMBODIMENTS

Figure 1:
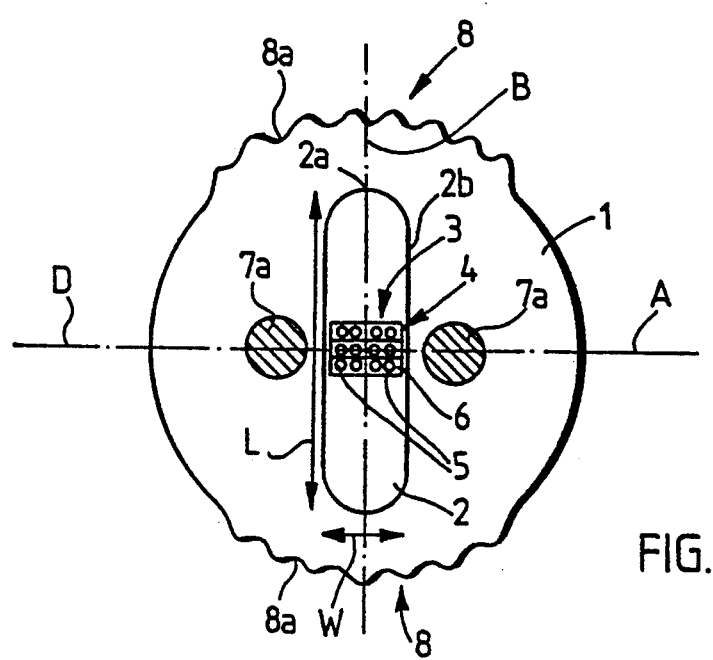
FIG. 1 shows a cross-section of a cable according to a first embodiment of the invention.

FIG. 1 shows a cross-section of a cable construction according to a first embodiment of the invention, in which construction in a protective sheath 1 made of cable plastic, e.g. polymer, is formed a cavity 2 extending in the longitudinal direction of the cable, in which cavity is arranged a package 3 of fibre ribbons, in this case consisting of three fibre ribbons 4 one upon another and optionally tied together. Each fibre ribbon comprises four optical fibres 5 placed in parallel with each other and a covering 6 joining them together, which covering is typically made of acrylate plastic. Inside the protective sheath 1 are also arranged two threadlike reinforcing members 7a extending in the longitudinal direction of the cable.

The cavity 2 is situated centrally with respect to the longitudinal centre axis of the cable and it has a cross-section with an elongated form along a diametral axis in the vertical direction in FIG. 1. The fibre ribbon package 3 is arranged inside the cavity in such a manner that its natural bending plane, indicated by the reference character A, is perpendicular with respect to the longitudinal plane B. The longitudinal plane B is perpendicular to the cross-sectional plane of the cable and parallel with the longitudinal axis of the cavity (a symmetry axis parallel with a long side 2b of the cavity). Inside the cavity 2, the fibre ribbons extend according to the invention along a path similar to that of a sine curve, oscillating with respect to their natural bending plane. On account of the oscillating path, the fibre ribbons have a specific excess length and thus also an allowance for strain with respect to the protective sheath. The natural bending plane of a fibre ribbon package means in this connection a plane on both sides of which the fibre ribbons extend and which is perpendicular to the cross-sectional plane of the cable and at the same time parallel with the transverse direction defined by one fibre ribbon 3.

The width W of the cavity in the horizontal direction of is such that the fibre ribbon package is not able to move substantially in said direction, while the length L of the cavity in the vertical direction is such that the fibre package has play in this direction. In practice, the length L of the cavity is typically three- to fivefold compared with its width W.

The reinforcing members 7a are arranged on opposite sides of the cavity in such a way that the bending plane D of the whole cable defined by them is also perpendicular with respect to the longitudinal plane B of the cavity. In this case, with the fibre ribbon package located centrally in the cavity 2, the bending plane D coincides with the bending plane A of the fibre ribbon package. The bending plane of the cable means in this example a level which is perpendicular to the cross-sectional plane of the cable and passes through the centre axes of the reinforcing members 7a.

Because the reinforcing members 7a are arranged on the main axis A of the cavity 2, at which the cavity is narrowest (at the transverse axis), the cross-section of the cable can be made as small as possible, and consequently, the packing density high.

Moreover, because the reinforcing members 7a are arranged symmetrically on opposite sides of the cavity, they can be made as a pair of conductors, which can be used for data transmission, e.g. for transmission of service signals, or for supply of power. In this case, it is preferable to use as reinforcing members copper or aluminum coated steel wires, which make both reinforcing and data transmission functions possible. In case the reinforcing members 7a are not used for data transmission, they can be e.g. mere steel wires or composite plastic bars (FRP=Fiber Reinforced Plastics).

Thanks to the location of the reinforcing members, the cable can also be branched easily, because the sheath 1 of an undamaged cable can be stripped in the direction of the reinforcing members, whereby the fibre ribbons are easily accessible without breaking them. An especially preferably embodiment in this respect is the construction shown in FIG. 2, which will be described later on.

From the cable geometry according to the invention it follows also that at bends of a channel installation only those areas of the outer surface of the protective sheath 1 of the cable touch the wall of the channel which are closest to the end parts 2a of the cavity 2. Due to this, it is preferably to provide the protective sheath with sliding/wear surfaces functioning as wear surfaces and reducing friction when the cable is drawn.

Such sliding surfaces, indicated by the reference numeral 8, can be realized e.g. by means of a reinforcement made on the surface of the protective sheath, which reinforcement is provided with grooves 8a in the longitudinal direction of the cable.

Figure 2:
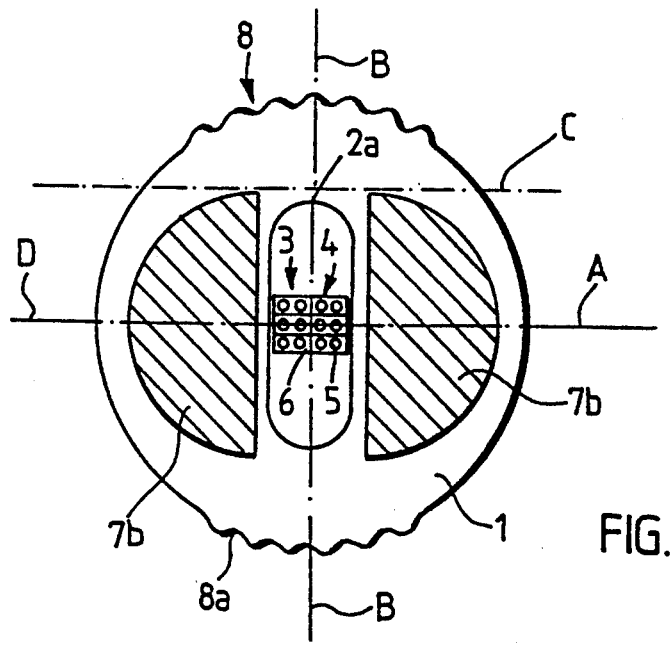
FIG. 2 shows a cross-section of a cable according to a second embodiment of the invention.

FIG. 2 shows a cross-section of a cable according to a second embodiment of the invention. In this case, reinforcing members 7b are semicircular in cross-section and they are in the direction of the longitudinal axis of the cavity at least as long as the cavity, preferably a little longer than the cavity, however, whereby they thus confine the cavity space and protect it. Then the fibre ribbons are easily accessible by stripping the protective sheath 1 along a plane defined by the reinforcing members 7b, i.e. along the plane C indicated in FIG. 2 by a broken line.

Figure 3:
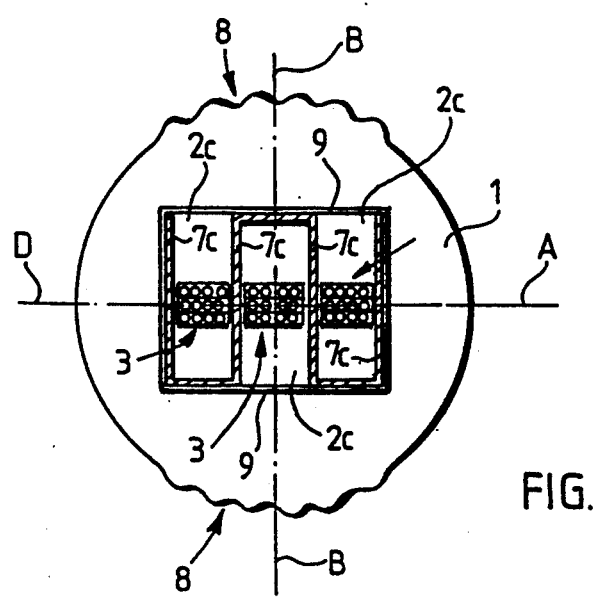
FIG. 3 shows a cross-section of a cable according to a third embodiment of the invention.

FIG. 3 shows a third embodiment of the cable construction of the invention, in which the reinforcing member consists of one metallic band 7c, the cross-sectional form of which is bent in such a way that four mutually parallel walls form three parallel substantially U-shaped spaces. At the manufacturing stage of the cable, tape 9 has been wound around the reinforcing member 7c, whereby the U-shaped spaces are closed and three parallel cavities 2c are formed for fibre packages 3. In this case, the cross-sectional form of the metallic band 7c defines the location of the bending plane D of the cable.

Figure 4A:
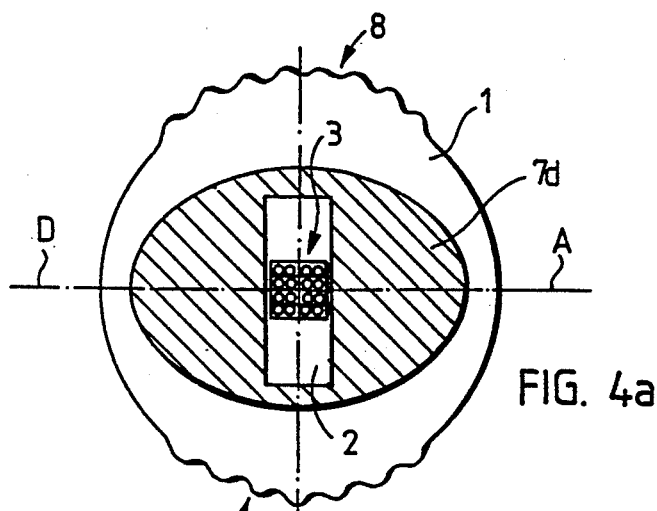
FIGS. 4a to 4c show cross-sections of different alternatives of a cable according to a fourth embodiment of the invention.
Figures 4B, 4C:
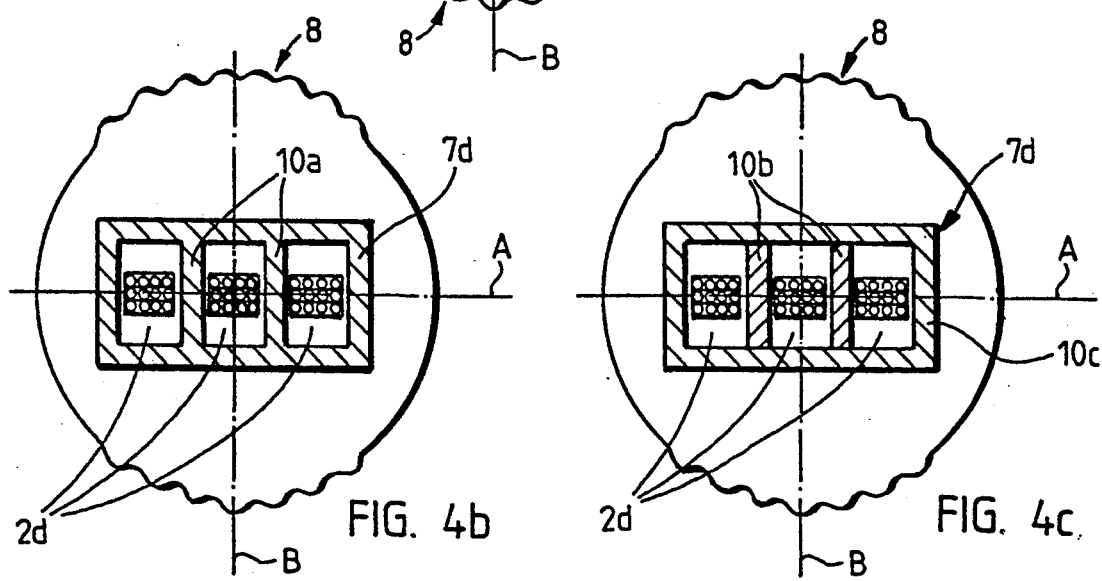

The reinforcing member can also be realized in the manner shown in FIGS. 4a to 4c, by forming the protective sheath 1 in two parts in such a way that a cable core 7d (or at least a substantial part of it) is manufactured of a rigid plastic or composite material and the surrounding protective sheath 1 of a softer and cheaper plastic material. Consequently, the cable core 7d (or the substantial part of it) acts as a reinforcing member defining the bending plane D of the whole cable.

In the case of FIG. 4a, the cable core 7d acting as a reinforcing member has an ellipse-shaped cross-section and encloses one cavity 3, in which the fibre ribbons can move freely.

In the case of FIG. 4b, the cable core 7d is rectangular in cross-section and encloses three parallel cavities 2d. The whole cable core with partition walls 10a constitutes in this case a reinforcing member.

The construction of FIG. 4c corresponds to the construction of FIG. 4b in other respects, except that partition walls 10b between the cavities are not reinforcing members there, but the reinforcing member consists of a peripheral part 10c of the cable core 7d.

In the constructions of the FIGS. 4a to 4c, the cable core 7d (or a part of it, such as the peripheral part 10c of the cable core in FIG. 4c) defines alone the properties of the cable, whereby the surrounding protective sheath serves only as protection against wear and humidity. Consequently, the protective sheath is not always even necessary.

One advantage of the present invention is also that, by means of a suitable dimensioning of the construction, the difference between the moments of inertia of the cable perpendicular to each other can be made as great as possible (the cable bends more easily in the direction in which the moment of inertia is smaller). The location of the bending plane of the cable can not always be defined directly by means of the centre axes of the reinforcing members or by means of other such features relating expressly to the structure of the cable, but the location of the bending plane also depends e.g. on the reinforcing members chosen and the dimensions and shapes thereof, on the materials chosen or other such factors defining the intensities of the moments of inertia.

Though the invention has been described referring to the embodiments illustrated drawing, it is clear that the invention is not restricted thereto, but it can be varied in many ways within the scope of the inventive idea described above and in the enclosed claims. For instance, the bending planes of the cable and the fibre ribbon package do not have to coincide in the manner presented in the examples above, because the location of the fibre ribbon package in the cavity and the location of the cavity itself in the cable can vary. The same cavity can even include two parallel fibre ribbon packages loosely joined together or the cable can comprise two or even several parallel cavities, each of which can include one fibre ribbon package or several parallel fibre ribbon packages tied together. In principle the cable could also have e.g. two cavities along a diametral axis, each of which includes one fibre ribbon package or several packages. The cavity can also be filled with fat or pressurized, and to the whole construction can be added laminated protective covers or other known protective or reinforcing constructions.

We claim:

1. A cable construction comprising a cable having a substantially circular cross-section with vertical and horizontal diametral axes, said cable having a cavity extending lengthwise along the cable, said cavity being centered on the vertical axis and elongated in the vertical direction, a package of fibre ribbons in said cavity, each said ribbon including a plurality of parallel optical fibres stacked one on the other in the vertical direction such that the fibres are confined in the horizontal direction but have free play in the vertical direction, and reinforcing means extending lengthwise in said cable, said reinforcing means being centered on said horizontal axis and being substantially symmetrically arranged relative to said vertical axis to provide less bending resistance around said horizontal axis than around said vertical axis, said cable having a core part constituting said reinforcing means, said core part providing said cavity therewithin.

2. A cable construction according to claim 1, wherein said core part has a substantially ellipse-shaped cross-section.

3. A cable construction according to claim 1, wherein said core part is substantially rectangular in cross-section and includes a peripheral part and at least two said cavities in parallel relation, said core part as a whole constituting the reinforcing means.

4. A cable construction according to claim 1, wherein said core part is substantially rectangular in cross-section and includes a peripheral part and partition walls enclosing at least two said cavities in parallel relation, said peripheral part constituting the reinforcing means.

5. A cable construction according to claim 4, wherein said cable has an outer surface provided with grooved, reinforcement portions arranged solely in areas closet to ends of the cavity on said vertical axis.

6. A cable construction comprising a cable having a substantially circular cross-section with vertical and horizontal diametral axes, said cable having a cavity extending lengthwise along the cable, said cavity being centered on the vertical axis and elongated in the vertical direction, a package of fibre ribbons in said cavity, each said ribbon including a plurality of parallel optical fibres stacked one on the other in the vertical direction such that the fibres are confined in the horizontal direction but have free play in the vertical direction, and reinforcing means extending lengthwise in said cable, said reinforcing means being centered on said horizontal axis and being substantially symmetrically arranged relative to said vertical axis to provide less bending resistance around said horizontal axis than around said vertical axis, said reinforcing means comprising a profile member centrally arranged in said cable and providing said cavity therewithin.

7. A cable construction according to claim 6, wherein said cable has an outer surface provided with grooved, reinforcement portions arranged solely in areas closest to ends of the cavity on said vertical axis.

* * * * *